Dec. 1, 1953  J. E. FRIDEN ET AL  2,661,266
HYDROGEN FLUORIDE TREATING SYSTEM
Filed April 28, 1951
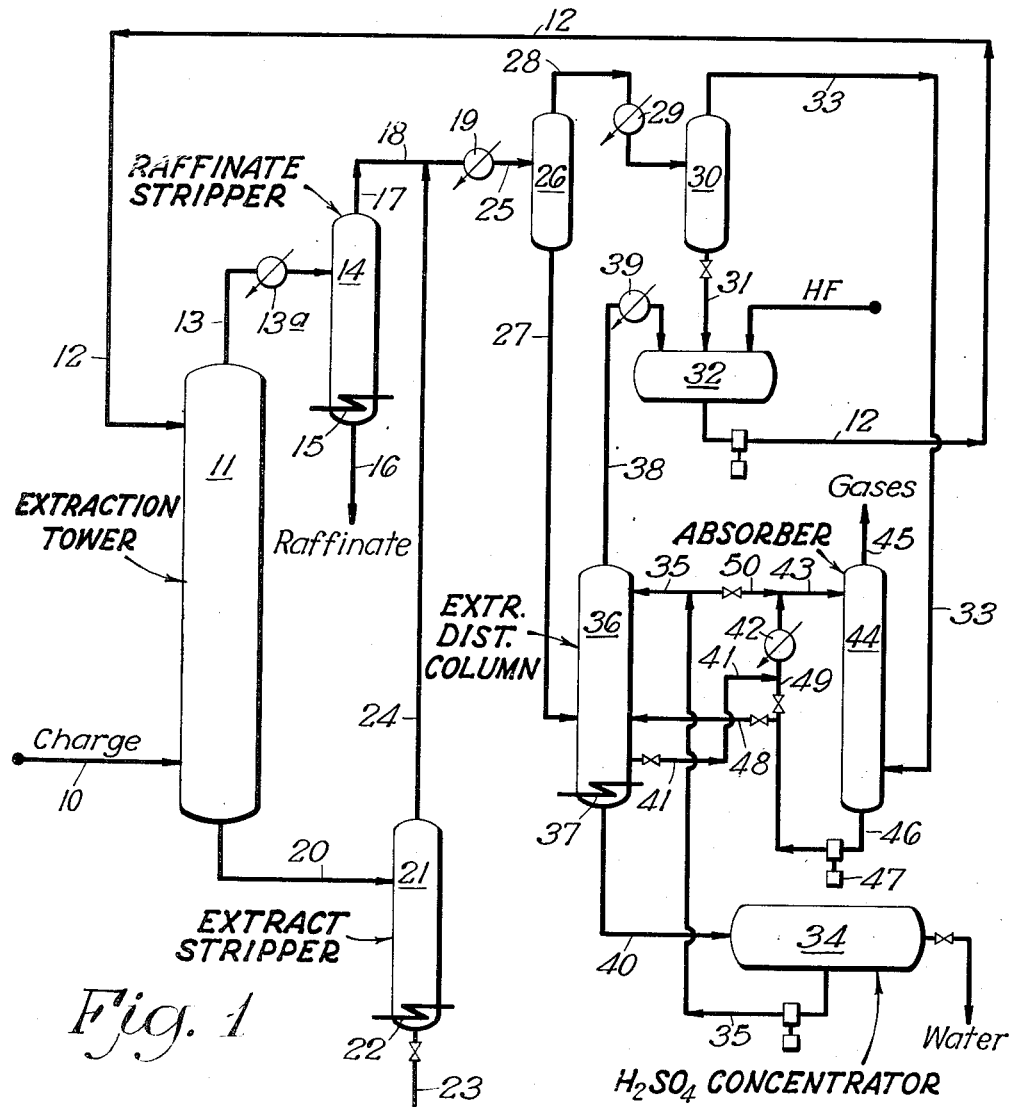
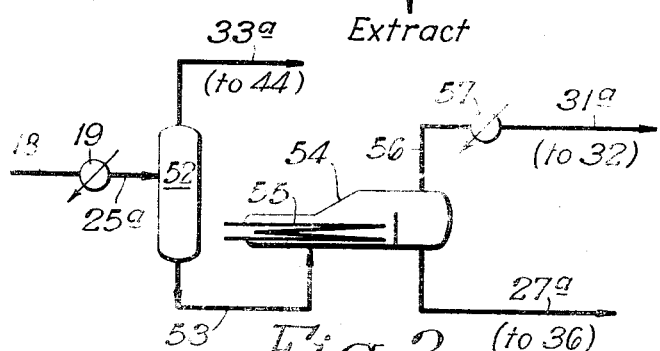
INVENTORS:-
James E. Friden
William A. Shire
BY Donald E. Payne
ATTORNEY Patented Dec. 1, 1953

2,661,266

UNITED STATES PATENT OFFICE 2,661,266

HYDROGEN FLUORIDE TREATING SYSTEM

James E. Friden, Whiting, and William A. Shire, Munster, Ind., assignors to Standard Oil Company, Chicago, Ill., a corporation of Indiana Application April 28, 1951, Serial No. 223,582

7 Claims. (Cl. 23—153)

This invention relates to a hydrogen fluoride treating system and it pertains more particularly to a system for treating hydrocarbons containing dissolved water and sulfur compounds with hydrogen fluoride wherein there is a tendency for water to build-up in the treating liquid and for hydrogen fluoride to escape with $H_2S$-containing vent gases.

It is known that many charging stocks for catalytic cracking processes contain large amounts of sulfur and also contain polycyclic aromatic hydrocarbons and other components which are undesirable in such charging stocks because said components have a deleterious affect on catalyst activity and/or they produce unduly large amounts of coke during the cracking step, thereby decreasing the potential capacity of a commercial catalytic cracking unit, increasing operating costs, and decreasing yields of valuable products. It is desirable to remove these objectionable components from such charging stocks by treating and/or extracting them with substantially anhydrous liquid hydrogen fluoride, but such extraction has presented many problems. One of the most vexatious of these problems is that of preventing build-up of impurities in the hydrogen fluoride recovered from the raffinate and extract and recycled in the system. Certain of the recovered hydrogen fluoride streams are contaminated with excessive amounts of water which cannot be removed from the hydrogen fluoride by simple distillation because of the constant boiling mixture which is formed. Other gasiform streams contain large amounts of hydrogen sulfide and other extraneous gases from which must be separated hydrogen fluoride contained therein. Any processes heretofore considered for purification of such streams have been unduly cumbersome, costly and inefficient particularly since they either fail to effect recovery of hydrogen fluoride in the desired purity or they resulted in excessive hydrogen fluoride losses. An object of the invention is to provide a method and means for effecting removal of objectionable components such as water, hydrogen sulfide, etc. from hydrogen fluoride streams which will result in production of substantially anhydrous hydrogen fluoride, which will result in negligible hydrogen fluoride losses and which will be simpler and less expensive than processes heretofore employed.

A further object of the invention is to provide an integrated system for recovering substantially anhydrous hydrogen fluoride from a plurality of streams, at least one of which contains inert gases and hydrogen sulfide as major impurities while another contains water as a major impurity. Another object is to integrate such a purification system with a commercial unit for extracting high boiling hydrocarbon charging stocks such as reduced crude oil and virgin, thermally cracked or catalytically cracked fractions thereof such as gas oils, furnace oils, heater oils or the like. A particular object is to minimize capital investment and operating costs and increase operating safety and efficiency in a commercial system for treating with hydrogen fluoride a hydrocarbon stream which contains organic sulfur compounds and dissolved moisture.

In accordance with our invention, we first treat with hydrogen fluoride a hydrocarbon oil, such for example as a gas oil which contains dissolved water and sulfur compounds, the treating being effected under conditions to give separate raffinate and extract phases. The raffinate and extract phases are simply freed or HF by refluxing with heat in stripper columns. The overhead from these columns, consisting essentially of HF, $H_2S$, gaseous hydrocarbons and water, is sent through a partial condenser to insure condensation of substantially all of the water together with at least a portion of the HF and then through a final condenser to condense substantially anhydrous HF from a gas mixture containing HF, gaseous hydrocarbons and $H_2S$. Alternatively, all HF which is condensible at cooling water temperature may be separated from gases and the condensed liquid may then be partially evaporated to obtain most of the HF in anhydrous form and to leave an unevaporated liquid containing substantially all of the water. In either case, the anhydrous HF condensate is sent directly to HF storage, the aqueous HF stream is extractively distilled with concentrated sulfuric acid to give an anhydrous HF stream which is introduced to HF storage and a susbtantially HF-free, water-diluted, sulfuric acid. At least a part of this water diluted sulfuric acid is concentrated for reuse in the extractive distillation step. Another stream of sulfuric acid, preferably from the extractive distillation column is employed as the scrubbing medium to recover HF from the HF-containing gas stream, the HF-free gases being vented from the top of the absorber and the HF-enriched sulfuric acid being returned to the extractive distillation column. Since there is a tendency for concentrated sulfuric acid to oxidize $H_2S$ and form colloidal sulfur, we prefer to employ a more dilute sulfuric acid as the absorber medium and/or sulfuric acid which contains an appreciable amount of HF for inhibiting the oxidizing effect which the sulfuric acid of given concentration would otherwise exhibit.

From the above description, it will be seen that the use of our sulfuric acid-HF recovery system makes possible a remarkable simplification in the HF-hydrocarbon extraction system. It enables the use of charging stocks containing dissolved water and sulfur compounds without the build up of water as would be encountered in the system of U. S. 2,532,495, and without loss of valuable HF in azeotrope as in U. S. 2,449,463 and 2,532,492. The invention will be more clearly understood from the following detailed description of a specific example thereof read in conjunction with the accompanying drawings in which:

Fig. 1 is a flow diagram schematically illustrating the HF treating system employing partial condensation for segregating anhydrous from aqueous hydrogen fluoride; and Fig. 2 is a detailed alternative partial vaporization scheme which may be employed in the system illustrated in Fig. 1.

While the invention in its broader aspects may be applicable to other hydrocarbon-HF treating systems, it is particularly advantageous to processes employing hydrogen fluoride as a catalyst and/or solvent and it will be described for refining with hydrogen fluoride about 40,000 barrels per stream day of a mixture of high sulfur virgin gas oil, coke still gas oil, and cracked gas oil, said mixture having an A. P. I. gravity of about 26.1°, a sulfur content of about 1.9 weight per cent, and a dissolved water content which may be as high as 0.1% by weight. Such a charging stock is preferably obtained from an accumulator tank wherein it is allowed to remain in a quiescent condition for a time sufficient to effect settling of dispersed or emulsified water so that the charging stock which is introduced by line 10 to extraction tower 11 contains as small amount of dissolved water as is economically feasible to obtain. Demulsifying agents, coalescers and other known means for facilitating separation of water from oil may, of course, be employed before the charging stock is introduced into the extraction tower.

The treating or extraction temperature in this case is in the range of 50 to 150° F., preferably about 120° F. Intimacy of contact in the tower may be increased by employing baffle plates of known construction or packing material, such as carbon steel Rachig rings, Berl saddles, shaped monel screen fragments or expanded metal lath, such packing material being fabricated from HF resistant material. Intimacy of contact may also be attained by intimately dispersing charging stock into an acid phase in the tower by distributors designed for that purpose.

Liquid substantially anhydrous hydrogen fluoride is introduced into the upper part of the extraction tower through line 12, preferably above the packed zone (when packing is employed). The counterflow of the gas oil charge and hydrogen fluoride in tower 11 results in both extraction and chemical reaction. The interface between acid and oil phases is preferably maintained at a high point in the column, i. e. at approximately or slightly above the HF inlet, so that the heavier acid phase is continuous throughout the countercurrent contacting section of the tower. It should be understood, however, that other known contacting means may be employed instead of, or in addition to, the illustrated countercurrent tower.

In this example, where the contaminated hydrocarbon charging rate is 40,000 barrels per stream day, the oil charging rate is about 523,000 pounds per hour and in addition there may be about 500 pounds per hour of water. Hydrogen fluoride is introduced from the top of the tower at about 174,000 pounds per hours, said hydrogen fluoride being substantially anhydrous, i. e. containing less than 1%, and preferably less than .5%, of water together with a very small amount of H2S and HF-soluble material. Contacting tower 11 is at a pressure sufficient to maintain both the hydrocarbons and the hydrogen fluoride in liquid phase, usually in the range of 30 to 100 p. s. i. g., for example about 70 p. s. i. g. The total residence or holding time of the oil in tower 11 should be in the range of about 5 to 50 minutes, e. g. about 15 minutes.

The raffinate oil phase is withdrawn from the top of tower 11 through conduit 13 into raffinate stripper tower 14 at the rate of about 405,000 pounds per hour. The stripper is operated with a top temperature in the range of about 190 to 250° F., e. g. 215° F. and reflux may be provided at the top of the tower by employing a cooler inside the tower or by returning overhead condensate to the upper part of the tower. The bottom temperature of the raffinate stripper is maintained by a reboiler diagrammatically illustrated as coil 15 which holds the stripper bottom temperature in the range of about 500 to 650° F., e. g. about 560° F. The raffinate stripper is preferably operated between atmospheric and 50 p. s. i. g., the pressure at the top of this particular stripper being 8 p. s. i. g. and at the bottom being 10 p. s. i. g. Under the operating conditions thus described, stripped raffinate containing not more than about 0.01 weight per cent of HF is withdrawn through line 16 at the rate of about 401,500 pounds per hour; this raffinate may then be charged to a catalytic cracking unit of the fixed bed, moving bed or fluid type employing solid siliceous catalyst either natural or synthetic and preferably of the silica alumina or silica magnesia type.

The net overhead from raffinate stripper is withdrawn from line 17 to line 18, which in turn leads to partial condenser 19, the purpose and operation of which will be later described.

The acid extract phase from the base of extraction tower 11 is withdrawn through line 20 directly to extract stripper 21 which is provided with a suitable reboiler at its base diagrammatically represented by coil 22 for maintaining a stripper bottom temperature in the range of about 575 to 700° F., e. g. about 640° F. The extract stripper operates under substantially the same pressure conditions as the raffinate stripper and a top temperature on the extraction stripper of about 190 to 250° F., e. g. about 215° F., is maintained by the use of suitable cooling coils or reflux obtained by partial condensate recycle. Stripped extract is withdrawn through line 23.

The total overhead from the extract stripper which contains the HF, water, H2S, and some light gaseous hydrocarbons is introduced by line 24 to line 18 and thence to partial condenser 19. In the system illustrated in Fig. 1, condenser 19 is operated to effect condensation of most of the water but only partial condensation of the HF, and the partially condensed mixture is introduced by line 25 into separator 26 from which substantially anhydrous HF (containing less than 1%, and preferably less than .5% water) is taken overhead while an aqueous HF stream containing most of the water is withdrawn by line 27. The overhead stream from separator 26 passes by line 28 through condenser 29 which is cooled sufficiently to effect condensation of as much of the HF as can readily be condensed with available cooling water, the condensate and uncondensed gases being introduced into separator 30. The HF condensed in this separator will be substantially anhydrous and it may, therefore, be introduced directly from the base of the separator through line 31 to HF storage 32 which in turn supplies the HF introduced to the extraction tower through line 12, uncondensed gases leaving the top of second separator 30 through line 33.

From the above description it will be seen that there are two HF streams which require further processing for HF recovery, namely the aqueous stream removed from the first separator through line 27 and the gaseous HF stream removed overhead from the second separator through line 33. Both of these streams are effectively processed by our sulfuric acid concentration system. Concentrated sulfuric acid of about 80% to 100% concentration, preferably at least about 90% concentration, and for example about 93% acid, is withdrawn from acid concentrator system 34 through line 35 to the upper part of extractive distillation column 36. The aqueous hydrogen fluoride stream from line 27 is introduced into the extractive distillation column at an intermediate or low level therein. The base of the extractive distillation tower is heated by a reboiler, diagrammatically illustrated as coil 37, to a temperature upwards of 260° F. and preferably in the range of about 300° to 350° F., i. e. about 325° F. The pressure in the extractive distillation tower may be from atmospheric to about 10 p. s. i. g. or more, the top temperature in the column being above 70° F. and preferably being in the range of 100 to nearly 300° F., e. g. about 170° F. The amount of concentrated acid employed should be sufficient when diluted with the water introduced with the aqueous HF stream to give a diluted sulfuric acid of at least 50% strength and preferably with a strength above 70%, or in the range of about 80 to 85%. Under the defined conditions, substantially anhydrous hydrogen fluoride is taken overhead from the extractive distillation column through line 38, condensed in cooler 39 and returned to HF storage 32. Diluted HF-free sulfuric acid is passed from the base of the extractive distillation tower 36 through line 40 to acid concentrator 34.

Diluted sulfuric acid containing about 1% or more of HF is withdrawn from tower 36 by line 41, cooled in cooler 42 to a temperature below 100° F. and introduced by line 43 at the top of absorber 44 into the base of which the gaseous HF stream from line 33 is introduced. The absorber is preferably operated at a superatmospheric pressure of at least about 10 to 30 p. s. i. g. Unabsorbed gases are vented from the top of the absorber through line 45 and the enriched acid with hydrogen fluoride is returned by line 46, pump 47 and line 48 to extractive distillation column 36. A part of the acid may be recycled by line 49 to the absorber and additional acid may be introduced from line 35 through line 50.

Since concentrated sulfuric acid has a pronounced oxidizing effect, the acid circulating system may be fouled to a certain extent by conversion of some H2S into colloidal sulfur. To minimize this oxidizing effect, we preferably introduce less concentrated acid into the top of the absorber than is introduced at the top of the extractive distillation column. Also, the presence of hydrogen fluoride in the sulfuric acid decreases its tendency toward oxidation and it is therefore desirable to have at least about 1% of hydrogen fluoride present in the sulfuric acid which is introduced at the top of the absorber. This may be accomplished by by-passing a small amount of the aqueous HF stream from line 27 into the acid stream entering the upper part of absorber 44 (through a line not shown) or by introducing the side stream of diluted acid from a point in the extractive distillation tower below the aqueous HF inlet but above the reboiler as hereinabove described. By maintaining the absorber at low temperature, i. e. below 100° F. and preferably below 80° F., by using a low acid strength, preferably below 85% and by employing a sulfuric acid which contains at least about 1% of hydrogen fluoride, the deposition of free colloidal sulfur in the absorber tower may be minimized or substantially avoided.

Instead of a multi-stage condensing system for separating substantially anhydrous HF from aqueous HF as illustrated in Fig. 1, we may effect sufficient cooling in condenser 19 to effect condensation of substantially all HF which is condensible at available cooling water temperature. As shown in Fig. 2, the effluent from the condenser in this case is introduced through line 25a into separator 52 and the uncondensed gases which leave the top of separator 52 may be conducted by line 33a to HF absorber 44. In order to minimize the load on the extractive distillation column, the condensate from separator 52 is introduced by line 53 to an evaporator 54 which is heated by steam coils 55 to a temperature and under such pressure as to effect vaporization of substantially anhydrous HF which can be removed through line 56, condensed in cooler 57, and directed by line 31a directly to HF storage 32. The aqueous HF stream in this case is withdrawn from the bottom of the evaporator through line 27a and introduced into the extractive distillation column as hereinabove described. The evaporator in this case may be operated at a temperature of 150 to 250° F. and under a pressure in the range of 25 to 75 p. s. i. g. with a liquid holding time of about 1 to 3 minutes under which conditions about 30 to 80% of the hydrogen fluoride may be vaporized and recovered in substantially anhydrous form.

From the foregoing description, it will be seen that we have accomplished the objects of our invention and have provided an HF treating system of remarkable simplicity and effectiveness with construction and operating costs enormously lower than were heretofore considered possible.

We claim:

1. The method of removing impurities in a hydrogen fluoride treating system wherein a hydrocarbon containing dissolved water and sulfur compounds is contacted with hydrogen fluoride under conditions to form raffinate and extract phases and said phases are separately stripped in stripping zones to remove substantially all hydrogen fluoride, water, hydrogen sulfide and normally gaseous hydrocarbons therefrom as stripper overhead streams, which method comprises partially condensing at least one of said stripper overhead streams to obtain a liquid aqueous hydrogen fluoride stream and a gaseous hydrogen fluoride stream containing H2S, extractively distilling said aqueous hydrogen fluoride stream with concentrated sulfuric acid by introducing said concentrated sulfuric acid at the top of said extractive distillation zone, introducing said aqueous hydrogen fluoride stream at an intermediate point in said extractive distillation zone and heating the base of said extractive distillation zone to a temperature in the range of 260° to 350° F., withdrawing substantially hydrogen fluoride-free sulfuric acid from the base of said extractive distillation zone and returning at least a part of said withdrawn acid to an acid-concentrating zone, scrubbing hydrogen fluoride from the gaseous hydrogen fluoride stream with sulfuric acid in an absorber zone maintained at a temperature below 100° F., venting $H_2S$ from the top of said absorber zone and introducing enriched sulfuric acid from the absorber zone to the extractive distillation zone.

2. The method of claim 1 which includes the steps of cooling a part of the diluted sulfuric acid from the extractive distillation zone and introducing said cooled diluted sulfuric acid to the upper part of said absorber zone.

3. The method of claim 2 wherein the sulfuric acid withdrawn from the extractive distillation zone is withdrawn at an intermediate level in said zone and contains at least about 1% hydrogen fluoride.

4. The method of claim 1 wherein the sulfuric acid introduced into the absorbing zone is less concentrated than the sulfuric acid introduced into the extractive distillation zone.

5. The method of claim 4 wherein the acid introduced into the absorber zone contains at least about 1% of hydrogen fluoride.

6. The method of claim 1 wherein the cooling employed in the partial condensing zone is sufficient to condense most of the water while leaving most of the hydrogen fluoride in vapor phase and which includes the further step of further cooling the vapors from the separating zone to effect condensation of substantially anhydrous hydrogen fluoride, and separating said anhydrous hydrogen fluoride from the hydrogen fluoride-containing gas stream before said gas stream is introduced into the absorber zone.

7. The method of claim 1 wherein the partial condenser is cooled to an extent sufficient to liquefy most of the hydrogen fluoride as well as the water and which includes the further steps of separating condensate from uncondensed hydrogen fluoride gas, introducing the hydrogen fluoride gas directly to the hydrogen fluoride absorber zone, vaporizing substantially anhydrous hydrogen fluoride from separated condensate consisting essentially of aqueous hydrogen fluoride and introducing said aqueous hydrogen fluoride into the extractive distillation zone.

JAMES E. FRIDEN.
WILLIAM A. SHIRE.

References Cited in the file of this patent
UNITED STATES PATENTS

| Number | Name | Date |
|---|---|---|
| 2,449,463 | Evering et al. | Sept. 14, 1948 |
| 2,450,588 | Evering et al. | Oct. 5, 1948 |
| 2,479,238 | Holm et al. | Aug. 16, 1949 |